Patented Sept. 23, 1941

2,257,021

UNITED STATES PATENT OFFICE 2,257,021

ESTERS OF DI HALO PROPIONIC ACID

Maxwell A. Pollack, Akron, Ohio, assignor to Pittsburgh Plate Glass Company, Allegheny County, Pa., a corporation of Pennsylvania No Drawing. Application November 22, 1940, Serial No. 366,726

9 Claims. (Cl. 260—487)

The present invention relates to novel compositions of matter and to the production thereof. In accordance with the present invention, I have prepared esters of alpha beta dihalopropionic acid such as $\alpha,\beta$-dichloropropionic acid, $\alpha,\beta$-dibromopropionic acid, $\alpha,\beta$-difluoropropionic acid, $\alpha,\beta$-di iodopropionic acid and polyhydric organic compounds which comprise a novel class of compounds. The esters may be prepared by reacting an $\alpha,\beta$-dihalopropionic acid such as $\alpha,\beta$-dichloropropionic acid with a suitable polyhydric organic compound such as ethylene, propylene, butylene, or amylene glycol, di-, tri-, or tetraethylene glycol or other polyglycol, methylene, trimethylene, tetramethylene or pentamethylene glycol, glycerine, methyl glycerine, sorbitol, mannitol, erythritol, pentaerythritol or other polyhydric alcohol. Likewise, esters of other polyhydric compounds such as polyvinyl alcohol, polyallyl, polymethallyl alcohol or other polymerized unsaturated alcohol, cellulose, cellulose monoacetate, methyl or ethyl cellulose, starch, glucose, sucrose, or other sugar, resorcinol, polyhydroxy cyclohexane benzene or naphthalene, dioxanediol, etc. may be prepared. Both mono and polyesters of these hydroxy compounds may be produced. Likewise, mixed esters such as the esters of ethylene glycol monoacrylate or monoacetate, and other derivatives of mono and polyesters of polyhydric alcohols may be prepared.

The esters of $\alpha,\beta$-dichloropropionic acid and polyhydroxy organic compounds are generally liquids, although in some cases the higher molecular weight esters may be solids. They are capable of a wide variety of uses and may be used as plasticizers for cellulose plastics such as cellulose acetate or butyrate, or methyl, ethyl or benzyl cellulose, or for other plastics such as phenol or urea condensation products, methyl methacrylate polymers, vinyl chloride, and vinyl acetate polymers, styrene, etc. Moreover, these materials may be used as solvents for various organic compounds and also as intermediates for the production of other chemicals such as alpha chloracrylic acid esters.

As previously noted, the esters may be prepared by reaction of the desired polyhydric alcohol with the dichloropropionic acid. This reaction is preferably conducted in the presence of suitable esterification catalyst, such as p-toluenesulphonic acid, benzene sulphonic acid, sulfuric acid, phosphoric acid, etc. If desired, however, the product may be produced by the action of a suitable salt such as alkali metal salt of the acid with a chlorohydrin such as ethylene or propylene or butylene chlorhydrin, glycerine, di- or monochlorohydrin, etc.

The following examples are illustrative:

Example I

A mixture of one mol of $\alpha,\beta$-dichloropropionic acid, 1.5 mols of ethylene glycol and one-half percent (based on the wt. of the acid and the alcohol) of p-toluenesulphonic acid was dissolved in an approximately equal volume of carbon tetrachloride and the solution was heated under a reflux condenser at the boiling temperature of the solution. The reflux condenser was provided with a means for collecting the condensate and for separating the water therefrom and for returning the carbon tetrachloride to the system. The process was continued until water was no longer evolved during the heating operation. The reaction mixture was then washed with water and the product was distilled under subatmospheric pressure. The glycol mono ester of $\alpha,\beta$-dichloropropionic acid distilled at a temperature of approximately 145–150° C. under a pressure of 5 mm. of mercury.

Example II

A mixture of 2.5 mols of $\alpha,\beta$-dichloropropionic acid, one mol of ethylene glycol and 1% (based on the wt. of the acid and the alcohol) of p-toluenesulphonic acid was dissolved in an approximately equal volume of carbon tetrachloride and the solution was heated under a reflux condenser at the boiling temperature of the solution. The reflux condenser was provided with means for collecting the condensate and for separating the water therefrom and for returning the carbon tetrachloride to the system. The process was continued until water was no longer evolved during the heating operation. The reaction mixture was then washed with water and the product was distilled under subatmospheric pressure. The ethylene diester of $\alpha,\beta$-dichloropropionic acid distilled at a temperature of approximately 155–160° C. under a pressure of 5 mm. of mercury.

Example III

The tri $\alpha,\beta$-dichloropropionate of glycerol was prepared by the method of Example II, by heating 4.5 mols of the acid with one mol of glycerol and 2 percent of p-toluenesulphonic acid in an equal volume of carbon tetrachloride. The ester was washed with water and distilled, collecting the desired product in the neighborhood of 200° C. under a pressure of approximately 3 mm. of mercury.

Although the present invention has been described with reference to the particular details of certain specific embodiments thereof, it is not intended that such details shall be regarded as limitations upon the scope of the invention except insofar as included in the accompanying claims.

I claim:

1. An ester of $\alpha,\beta$-dichloropropionic acid and a polyhydroxy organic compound.
2. An ester of $\alpha,\beta$-dichloropropionic acid and a polyhydric alcohol.
3. Ethylene glycol (di-$\alpha,\beta$-dichloropropionate).
4. Glycerol (poly-$\alpha,\beta$-dichloropropionate).
5. A polyester of $\alpha,\beta$-dichloropropionic acid and a polyhydric alcohol.
6. An ester of $\alpha,\beta$-dihalopropionic acid and polyhydroxy organic compound.
7. A polyester of $\alpha,\beta$-dihalopropionic acid and a polyhydric alcohol.
8. A polyester of $\alpha,\beta$-dichloropropionic acid and a polyhydroxy organic compound.
9. Ethylene glycol (mono $\alpha,\beta$-dichloropropionate).

MAXWELL A. POLLACK.